(12) United States Patent
Bastos et al.

(10) Patent No.: US 6,967,663 B1
(45) Date of Patent: Nov. 22, 2005

(54) ANTIALIASING USING HYBRID SUPERSAMPLING-MULTISAMPLING

(75) Inventors: Rui M. Bastos, Santa Clara, CA (US); Steven E. Molnar, Chapel Hill, NC (US); Michael J. M. Toksvig, Palo Alto, CA (US); Matthew J. Craighead, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 112 days.

(21) Appl. No.: 10/658,056

(22) Filed: Sep. 8, 2003

(51) Int. Cl.[7] ............................. G09G 5/00; G06T 15/50
(52) U.S. Cl. ........................................ 345/613; 345/426
(58) Field of Search .................. 345/611–614, 426, 345/422

(56) References Cited

U.S. PATENT DOCUMENTS

| | | | | |
|---|---|---|---|---|
| 5,377,313 A | * | 12/1994 | Scheibl | 345/422 |
| 5,684,939 A | * | 11/1997 | Foran et al. | 345/612 |
| 5,742,749 A | * | 4/1998 | Foran et al. | 345/426 |
| 5,870,097 A | * | 2/1999 | Snyder et al. | 345/426 |

OTHER PUBLICATIONS

Haeberli, Paul et al. "The Accumulation Buffer: Hardware Support for High-Quality Rendering" Computer Graphics, vol. 24, No. 4, Silicon Graphics Computer Systems Aug. 1990.

Salvator, Dave "ExtremeTech 3D Pipeline Tutorial" Jun. 13, 2001.

* cited by examiner

*Primary Examiner*—Matthew C. Bella
*Assistant Examiner*—Anthony Blackman
(74) *Attorney, Agent, or Firm*—Townsend and Townsend and Crew LLP

(57) ABSTRACT

Hybrid sampling of pixels of an image involves generating shading values at multiple shading sample locations and generating depth values at multiple depth sample locations, with the number of depth sample locations exceeding the number of shading sample locations. Each shading sample location is associated with one or more of the depth sample locations. Generation and filtering of hybrid sampled pixel data can be done within a graphics processing system, transparent to an application that provides image data.

27 Claims, 6 Drawing Sheets

ANTIALIASING USING HYBRID SUPERSAMPLING-MULTISAMPLING

CROSS-REFERENCES TO RELATED APPLICATIONS

The present disclosure is related to commonly-assigned co-pending U.S. patent application Ser. No. 10/187,111, filed Jun. 28, 2002, entitled "System & Method for Filtering Graphics Data on Scanout to a Monitor," which disclosure is incorporated herein by reference for all purposes.

BACKGROUND OF THE INVENTION

The present invention relates in general to antialiasing techniques for computer graphics systems, and in particular to antialiasing using hybrid supersampled/multisampled pixel data.

Display devices, such as monitor screens, produce images using an array of small-size picture elements ("pixels"), each having a solid color. The color of each pixel is independently controllable so that an arbitrary image can be produced on the display device. In many instances, pixel color is determined using a graphics processing system that receives image data to be rendered from an application program. The image data generally includes position, location, size, and color information for a number of simple polygons (e.g., triangles) referred to as "primitives," of which the image is composed. The graphics processing system rasterizes the image data by sampling the primitives at a number of predetermined sample locations (e.g., a point corresponding to the center of each pixel), thereby generating a shading value (also referred to as a "color value") for each pixel. These shading values are stored in a frame buffer that is periodically scanned out to a display device, thereby producing a viewable image.

In general, the shading value for a pixel is determined according to the color of a primitive that covers the pixel. For instance, FIG. 1A illustrates four pixels 101, 102, 103, 104 of a display and two primitives 120, 130 to be rendered. A sample location 105, 106, 107, 108 is illustrated for each pixel, and the shading value of each pixel is determined based on the primitive(s) that cover the sample location. Shading values can be determined using numerous well-known techniques, such as constant shading, interpolation of shading values for each vertex, Gouraud shading, Phong shading, and shading computed using a user-written fragment program.

When two or more primitives cover the same sample location, color is generally based on the visible one (typically the one in front). In many systems, front-to-back ordering of primitives involves "depth buffering." That is, the objects making up the image are rasterized one at a time, with no particular requirement as to order. A depth value for each sampling location, representing the distance from the nearest primitive to the view point, is stored along with the shading value obtained from the nearest primitive. For instance, in FIG. 1A, object 130 covers all of sample locations 105, 106, 107, 108. If primitive 130 is rasterized first, the shading and depth values of primitive 130 are stored for each sample location. Primitive 120 covers sample locations 105, 107 but not sample locations 106, 108. When primitive 120 is rasterized, the shading and depth values for sample locations 105, 107 are modified, but the shading and depth values for sample locations 106, 108 are not. Depth values are also useful for other purposes, such as texture mapping.

Regardless of particular techniques used, rasterization can lead to "aliasing," i.e., undesirable visual artifacts that result from the finite spacing of the sample locations. For instance, in FIG. 1A, primitive 120 only partially covers each of pixels 101, 102, 103, 104. Sampling at locations 105, 106, 107, 108 causes pixels 101 and 103 to take on the color of primitive 120, while pixels 102 and 104 take on the color of primitive 130. As a result, the edge of primitive 120 will appear jagged, not smooth. Aliasing can also produce other artifacts, such as apparent irregularities in regular patterns.

To reduce these artifacts, various "anti-aliasing" techniques have been developed. Most of these techniques rely on some form of "oversampling," i.e., providing multiple shading values per pixel. Prior to display, the shading values for each pixel are blended, or "downfiltered," to arrive at a final color value for that pixel. Two conventional oversampling techniques are "supersampling" and "multisampling."

Supersampling can be done using the techniques described above, except that each pixel is sampled at multiple locations, as illustrated in FIG. 1B. In this example, pixel 101 has four sample locations 111, 112, 113, and 114. At each location, 111, 112, 113, 114, a shading value and a depth value are computed, as if each location were in a different pixel. In the case of pixel 101, the shading and depth values for locations 113 and 114 are determined from primitive 120, while the shading and depth values at locations 111 and 112 are determined from primitive 130. Upon downfiltering of the four shading values, pixel 101 has a color that blends the respective colors of primitives 120 and 130. Pixel 102 will be a different blended color, as it has two sample locations 121, 122 that are covered by primitive 130 and two sample locations 123, 124 that are covered by primitive 120. In this way, the apparent jaggedness of the edge of primitive 120 is smoothed.

Supersampling, however, significantly increases the computational burden by increasing the number of shading computations that are required for each pixel. It is generally desirable to allow the color of primitive 120 to vary as a function of position within the primitive, so that the shading value at location 113 generally is not the same as at location 114, even though both locations are covered by primitive 120. Consequently, each additional sample location within a pixel requires an additional computation of the shading value. To do the fourfold supersampling illustrated in FIG. 1B quadruples the number of shading computations required, placing very heavy demands on the rendering system.

Multisampling, illustrated in FIG. 1C, is an alternative technique that provides some antialiasing benefit while considerably reducing the computational burden. In multisampling, depth and coverage for pixel 101 are determined at each of a number of depth sample locations (also referred to as "depth locations") 111, 112, 113, 114, as in supersampling. Unlike supersampling, however, the shading is computed only once per pixel (e.g., at location 105). This one shading value is stored along with the depth value for each depth location 111, 112, 113, 114 that is covered by the primitive. Subsequent primitives are rasterized as if the previous primitive had been supersampled. For example, in FIG. 1C, if primitive 130 is rasterized first, the shading value for pixel 101 is determined at location 105. Since all four depth locations 111, 112, 113, 114 are covered by primitive 130, the shading value at location 105 is stored for each depth location, together with the depth value. When primitive 120 is rasterized, a shading value for pixel 101 is again determined at location 105. Primitive 120, which is in front of primitive 130, covers depth locations 113, 114, but not depth locations 111, 112. Thus, the stored shading values for depth locations 113, 114 are replaced with the shading value for primitive 130 determined at location 105; the depth values are also replaced. The shading values for depth locations 111, 112, which are not covered by primitive 120, are not changed. Upon downfiltering of the shading values for the four sample locations, pixel 101 will have a color value that blends the respective colors of primitives 120 and 130. If the shading location is outside a primitive, as is the case for shading location 106 of pixel 102 (which is outside primitive 120), then the color is typically determined outside the primitive. This can introduce inaccuracies for depth locations that are inside the primitive; for instance, depth locations 123, 124 may have an incorrect shading value. Such inaccuracies generally have only minor effect on image quality. In order to avoid these inaccuracies, some multisampling solutions perturb the shading location so that it lies within the primitive.

For a given number of depth sample locations per pixel, multisampling generally has a lower computational burden than supersampling, since determining depth and coverage is usually significantly simpler than determining shading; however, supersampling can improve the antialiasing effect for pixels that are not at the edge of a primitive when the shading of the primitive has high spatial frequencies, such as sharp specular highlights.

It would therefore be desirable to provide an antialiasing method that has antialiasing capability comparable to supersampling with a given number of samples per pixel without the added computational burden associated with supersampling.

BRIEF SUMMARY OF THE INVENTION

Embodiments of the present invention relate to generation and downfiltering of hybrid supersampled/multisampled pixel data, referred to herein as "hybrid sampled" pixel data. Hybrid sampling involves generating shading values at multiple shading sample locations and generating depth values at multiple depth sample locations, with the number of depth sample locations exceeding the number of shading sample locations. Each shading sample location is associated with one or more of the depth sample locations. Generation and filtering of hybrid sampled pixel data can be done within a graphics processing system, transparent to the application.

According to one aspect of the invention, a method for generating a color value for a pixel from geometry data is provided. A first number of shading locations and a second number of depth locations are selected for the pixel, the second number being larger than the first number. Each of the second number of depth locations is associated with one of the shading locations. Under control of a graphics processing subsystem, a number of hybrid sampled data points (equal to the number of depth locations) is generated. The act of generating includes computing a shading value at each of the first plurality of shading locations and a depth value at each of the second plurality of depth locations and storing one of the depth values and the associated shading value as one of the hybrid sampled data points. An antialiased color value for the pixel is computed using the hybrid sampled data points. In some embodiments, the number of shading locations and the number of depth locations may be determined based on one or more configurable parameters.

According to another aspect of the invention, the act of generating the plurality of hybrid sampled data points may include performing at least two multisampling operations on the pixel, with each multisampling operation using a different one of the shading locations and a different subset of the depth locations and generating a different subset of the plurality of hybrid sampled data points.

In some embodiments, the act of selecting the first plurality of shading locations and the second plurality of depth locations for the pixel may include segmenting a viewable area that includes the pixel into a number of sub pixels, each sub pixel having a size smaller than a size of the pixel, with each sub pixel including one of the shading locations and a subset of the depth locations. The pixel may be divided, e.g., into an integer number of subpixels.

In other embodiments, the act of selecting the first plurality of shading locations and the second plurality of depth locations for the pixel may include defining a multisampling pattern for the pixel, with the multisampling pattern including one of the depth locations and at least two of the shading locations; generating multiple iterations of the geometry data, with each iteration having a different offset relative to a boundary of the pixel; and applying the multisampling pattern to each of the iterations of the geometry data. Each of the offsets advantageously corresponds to an amount less than a pixel size, and one of the offsets may be equal to zero. The depth values and the associated shading value obtained from each iteration may be stored in a respective one of a plurality of buffers.

In still other embodiments, the act of selecting the first plurality of shading locations and the second plurality of depth locations for the pixel may include: defining a multisampling pattern for the pixel, with the multisampling pattern including one of the depth locations and at least two of the shading locations; defining a plurality of non overlapping regions in an image coordinate space, with each region including a virtual pixel corresponding to the pixel; relocating the geometry data to a position within each of the regions, with the position of the relocated geometry data relative to a boundary of the region being shifted by an amount less than a pixel size; and applying the multisampling pattern to each of the virtual pixels. For one of the regions, the amount less than a pixel size may be equal to zero.

According to yet another aspect of the invention, a system for generating a color value for a pixel from geometry data includes a multisampling rasterizer, control logic, and a downfiltering unit. The multisampling rasterizer is configured to receive the geometry data and perform a multisampling operation on the pixel, the multisampling operation generating a number of depth values at a number of depth locations for the pixel and one shading value the shading value being associated with each of the plurality of depth locations. The control logic is configured to use the multisampling rasterizer to perform a plurality of multisampling operations on the pixel. The downfiltering unit is configured to combine the shading values generated during the plurality of multisampling operations, thereby generating a color value for the pixel.

According to a further aspect of the invention, an apparatus for generating a color value for a pixel from geometry data includes a graphics processor, a frame buffer, and a downfiltering unit. The graphics processor includes a multisampling rasterizer configured to receive the geometry data and perform a multisampling operation on the pixel, the multisampling operation generating a plurality of depth values at a plurality of depth locations for the pixel and one shading value, the shading value being associated with each of the plurality of depth locations; control logic configured to use the multisampling rasterizer to perform a plurality of multisampling operations on the pixel; and a downfiltering unit configured to combine the shading values generated during the plurality of multisampling operations, thereby generating a color value for the pixel. The control logic is configured to use the multisampling rasterizer to perform a plurality of multisampling operations on the pixel. The frame buffer is configured to store the shading values generated during the plurality of multisampling operations. The downfiltering unit configured to combine the shading values stored in the frame buffer, thereby generating a color value for the pixel. In some embodiments, the apparatus also includes a graphics driver module configured to communicate with the graphics processor and to configure a parameter for the plurality of multisampling operations. The parameter may determine, e.g., a number of multisampling operations to be performed and/or a number of depth locations to be used during each of the multisampling operation.

The following detailed description together with the accompanying drawings will provide a better understanding of the nature and advantages of the present invention.

DETAILED DESCRIPTION OF THE INVENTION

Embodiments of the present invention provide generation and downfiltering of hybrid supersampled/multisampled pixels, referred to herein as "hybrid sampled" pixels. Hybrid sampling involves generating shading values (also referred to as "color values") at multiple shading sample locations and generating depth values at multiple depth sample locations, with the number of depth sample locations exceeding the number of shading sample locations. As in multisampling, a shading sample location can be associated with more than one depth sample location, but providing more than one shading value per pixel can result in improved antialiasing. According to embodiments of the present invention, generation and filtering of hybrid sampled pixel data can be done within a graphics processing system, transparent to the application. In some embodiments, an application program interface (API) is provided to allow an application programmer to control various settings related to hybrid sampling, as will be described below.

Figure 1A:
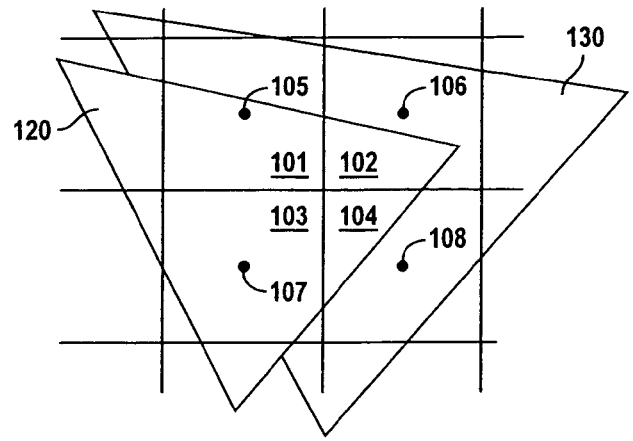
FIGS. 1A–C are illustrations of sampling patterns for conventional rasterizing and antialiasing techniques.
Figure 1B:
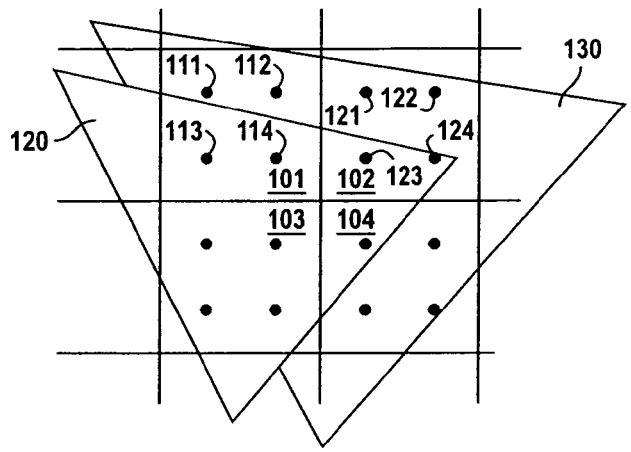
Figure 1C:
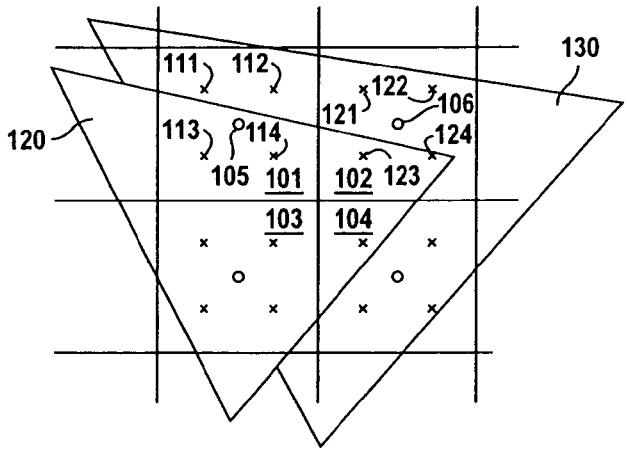
Figure 2:
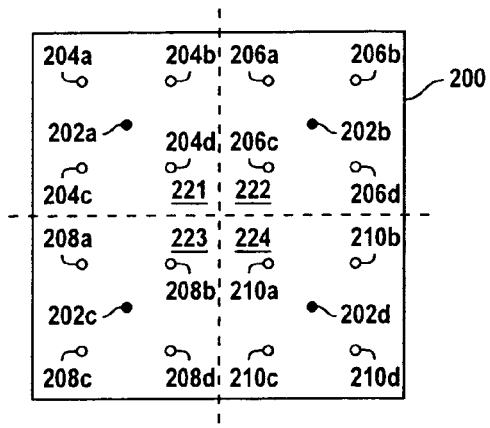
FIG. 2 is an illustration of a hybrid sampling pattern according to an embodiment of the present invention.

An example of a hybrid-sampled pixel 200 according to an embodiment of the present invention is shown in FIG. 2. Hybrid-sampled pixel 200 has four shading sample locations (also referred to as "shading locations") 202a–d arranged in a quad (i.e., a 2×2 pattern) and sixteen depth sample locations (also referred to as "depth locations") 204a–d, 206a–d, 208a–d, 210a–d arranged in sub-quads (i.e., a 2×2 pattern within each quad). In this example, depth locations 204a–d are all associated with shading location 202a. That is, when it is determined that a primitive is visible at any of depth locations 204a–d, the shading value to be stored for that depth location is the value computed for shading location 202a. Similarly, depth locations 206a–d, 208a–d, and 210a–d are associated, respectively, with shading locations 202b, 202c, and 202d. The sampling pattern formed by depth locations 204a–d and shading location 202a is referred to herein as a "square-centered 4" pattern. It is to be understood that other sampling patterns and numbers of depth and/or shading samples may be used, and depth locations are not required to be associated with the nearest shading location.

I. Computer System

Figure 3:
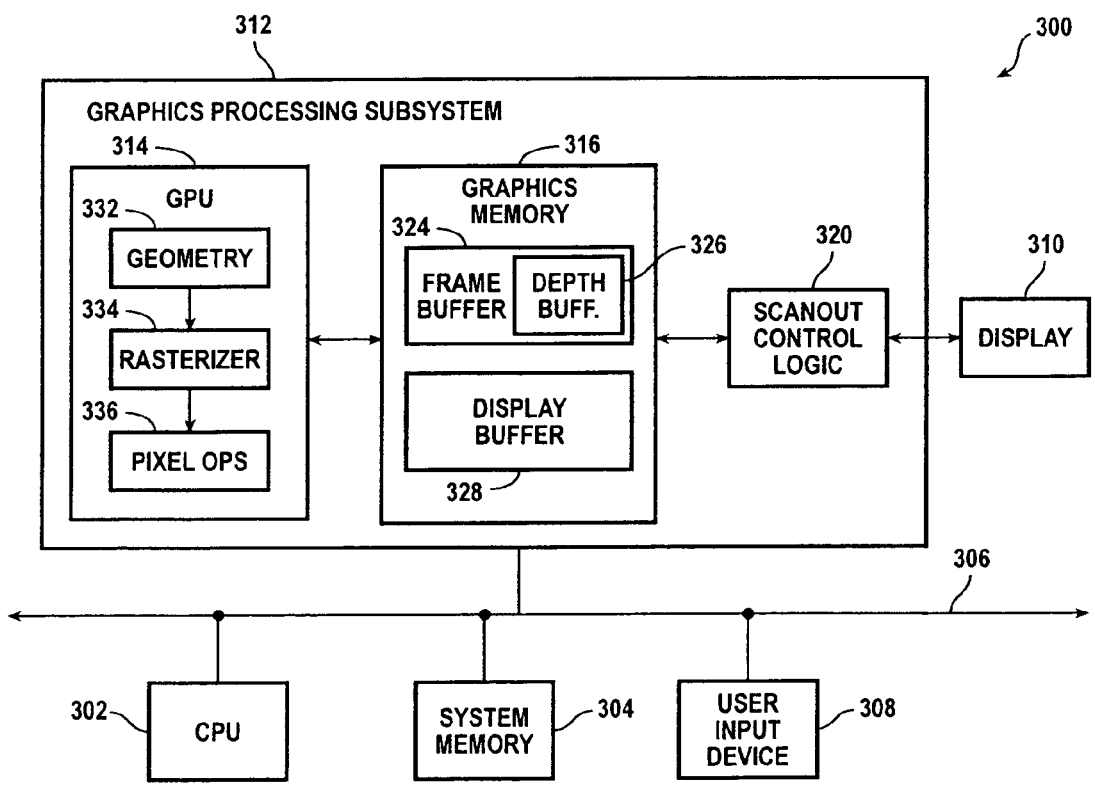
FIG. 3 is a simplified block diagram of a computer system according to an embodiment of the present invention.

FIG. 3 is a block diagram of a computer system 300 suitable for implementing the present invention. Computer system 300 includes a central processing unit (CPU) 302 and a system memory 304 communicating via a system bus 306. User input is received from one or more user input devices 308 (e.g., keyboard, mouse) coupled to system bus 306. Visual output is provided on a display device 310 (e.g., a conventional CRT- or LCD-based monitor) operating under control of a graphics processing subsystem 312 coupled to system bus 306. Graphics processing subsystem 312 includes a graphics processing unit (GPU) 314, a graphics memory 316, and scanout control logic 320. Graphics memory 316 includes a frame buffer 324 that stores a shading value corresponding to each depth location for hybrid sampled pixels of an image. Frame buffer 324 advantageously includes a depth buffer 326 that stores a depth value at each depth location. Depth buffer 326 may be implemented using bit planes in a video memory device implementing frame buffer 324, a separate section within a memory device implementing frame buffer 326, or a separate memory device. A display buffer 328 stores a final color value for each pixel.

In operation, CPU 302 executes one or more application programs that generate geometry data, i.e., data describing components of an image to be rendered. The geometry data typically includes vertex coordinates and color information for one or more primitives (e.g., triangles or other polygons) that make up the image. The geometry data can also define relationships among various primitives (e.g., a group of primitives may be identified as making up an object, such as a table, and the relation of that object to other objects in the image can be specified), a view point and view direction for the image, boundaries of the viewable area, lighting parameters, and so on. Numerous techniques for generating geometry data are known in the art, and any technique can be used. This data is provided via the system bus to the graphics processing subsystem.

GPU 314 includes a geometry unit 332 that receives the geometry data for an image to be rendered and performs various transformations on that data. Depending on implementation, these transformations can include lighting transformations; coordinate transformations to a viewing space defined by image plane (x, y) and depth (z) coordinates; culling of unseen primitives (e.g., back-facing primitives or primitives located entirely outside the viewable region); clipping of unseen portions of primitives; and the like. Any kind of transformation or other manipulation of the geometry data can be implemented; numerous examples are known in the art.

Geometry unit 332 provides transformed geometry data to a rasterizer 334. Rasterizer 334 converts the geometry data to pixel data, e.g., using scan-conversion. In one embodiment, rasterizer 334 multisamples the geometry data. That is, for each pixel that is wholly or partially covered by a primitive, rasterizer 334 performs a "multisampling operation" in which a single shading value is generated for the pixel, while depth values and coverage are determined at multiple depth locations within the pixel. For each depth location that is covered by the primitive, the shading value is stored in frame buffer 324, and the depth value is stored in depth buffer 326. The shading value can be determined using various techniques, including flat shading, Gouraud shading, and Phong shading. Shading values can also be determined using a programmable shader that executes application-specific shading code provided with the geometry data. Programmable shaders are known in the art.

As will be described below, multisampling rasterizer 334 can process a primitive multiple times (each processing of a primitive is referred to as a "multisampling pass") using a different set of sampling locations each time, thereby generating hybrid-sampled pixel data. In some embodiments, an accumulation buffer (not shown) may also be provided in graphics memory 316 to accumulate data from the multisampling passes over a primitive, with accumulated results ultimately being provided to frame buffer 324.

After rasterization, a pixel operation unit 336 may perform additional operations on the pixel data. In accordance with an embodiment of the present invention, these operations can include texture mapping as well as downfiltering (or blending) of the hybrid sampled pixel data to produce a single shading value per pixel, as will be described below. Downfiltered pixel data is stored in display buffer 328.

Pixel data in display buffer 328 is read out by scanout control logic 320, which generates control signals for display device 310. In one embodiment, scanout control logic 320 reads the display buffer and refreshes the display at a constant rate (e.g., 80 Hz); the refresh rate can be a user-selectable parameter. Scanout control logic 320 may also perform various operations such as re-scaling of color values; generating composite screen images by combining the pixel data from graphics memory 318 with data for a video or cursor overlay image or the like; digital-to-analog conversion; and so on.

It will be appreciated that FIG. 3 is illustrative and that modifications are possible. For instance, all or part of downfiltering can be performed during scanout by scanout control logic 320, in which case display buffer 328 may not be used. Filtering on scanout is described in the above-referenced co-pending application No. 10/187,111. Graphics memory 316 can be implemented using one or more memory devices. Frame buffer 324 and depth buffer 326 may be implemented as distinct memory devices or as logical divisions within a single memory device. Any or all of the buffers can be implemented using double-buffering or triple-buffering techniques, so that data for one frame of an image can be read while data for a subsequent frame is being written. The display device can be any pixel-based display, e.g., a CRT or LCD monitor, laser projection system, printer, etc. GPU 314 or its components can be implemented using one or more programmable processors programmed with appropriate software, application-specific integrated circuits (ASICs), other integrated circuit technologies, or any combination of these. In view of the present disclosure, persons of ordinary skill in the art will recognize that the present invention can be embodied in a wide variety of system configurations.

II. Examples of Hybrid Sampling Processes

As stated above, rasterizer 334 can be implemented as a multisampling rasterizer that processes a pixel multiple times to generate hybrid-sampled data. Specific embodiments illustrating the use of a multisampling rasterizer 334 to generate hybrid sampled pixel data will now be described; it will be appreciated that a hybrid-sampling rasterizer 334 can also be implemented.

A. Pre-Bloated Image Size

As described above, FIG. 2 shows an example of a sampling pattern for a hybrid-sampled pixel 200. In this instance, a square-centered 4 multisampling pattern is repeated four times, each time in a different quadrant of the pixel.

Figure 4:
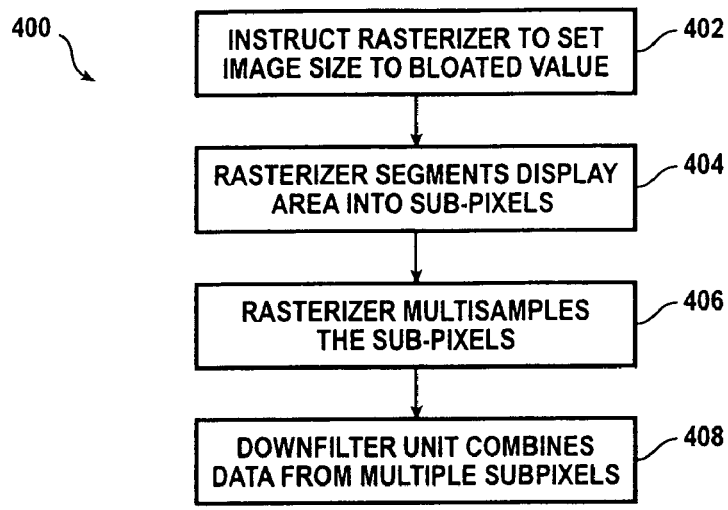
FIG. 4 is a flow chart of a process for generating hybrid-sampled pixel data according to a first embodiment of the present invention.

FIG. 4 is a flow chart illustrating a process 400 for generating a hybrid sampling pattern such as that shown in FIG. 2 by "pre-bloating" the display resolution within the graphics pipeline. In general, display resolution can be specified by the number of pixels in each row ($N_X$) and a number of pixels in each column ($N_Y$). Rasterizer 334 of FIG. 3 uses these parameters to define pixel boundaries and determine depth and shading locations for each pixel (e.g., based on the square-centered 4 pattern), then multisamples the pixels using the selected locations. In process 400, the display resolution is specified to rasterizer 334 as being larger than the true resolution, thereby causing rasterizer 334 to generate hybrid-sampled data.

More specifically, at step 402, graphics processor 314 sets the display resolution used by rasterizer 334 to a "bloated" value, i.e., a value larger than the actual number of pixels ($N_X$ by $N_Y$) in the display area. For instance, to obtain the pattern of FIG. 2, GPU 314 can instruct rasterizer 334 to use a display resolution of $2N_X$ by $2N_Y$.

At step 406, rasterizer 334 segments the display area into "sub-pixels," based on the bloated display resolution. In general, the number of sub-pixels is larger than the actual number of pixels in the display area, and each sub-pixel is smaller than a pixel. For instance, in the embodiment of FIG. 2, rasterizer 334 segments the display area such that pixel 200 is divided into four sub-pixels 221, 222, 223, 224, with the sub-pixel divisions being shown by dashed lines.

At step 406, rasterizer 334 multisamples the sub-pixels, thereby generating hybrid sampled data for each display pixel. For example, in the embodiment of FIG. 2, rasterizer 334 multisamples each sub-pixel 221, 222, 223, 224 using a square-centered 4 pattern. The result is pixel data that is hybrid sampled.

At step 408, a downfiltering unit (which may be, e.g., pixel operations unit 336 or scanout control logic 320 of FIG. 3, or a combination of the two) downfilters the hybrid sampled data to produce pixel data at the true display resolution ($N_X$ by $N_Y$). For example, in pixel 200 of FIG. 2, the downfiltering unit generates a single shading value from the shading values stored for the sixteen depth sample locations 204a–d, 206a–d, 208a–d, 210a–d. This shading value can be stored in display buffer 328 or provided directly to display device 310, depending on implementation.

Examples of downfiltering techniques that can be used at step 406 will be described below.

It is to be understood that process 400 is illustrative and that modifications and variations are possible. For instance, the sampling pattern is not limited to the square-centered 4 pattern of FIG. 2. The bloated display resolution is not limited to any particular value, and the increase in each direction need not be equal. For instance, in one alternative embodiment, a bloated resolution of $N_X$ by $2N_Y$ is used. In addition, the bloated display resolution need not be an integer multiple of the true display resolution; e.g., a non-integer multiple such as $1.5N_X$ by $1.5N_Y$ can also be used. In this instance, a sub-pixel may provide some of the data for more than one of the pixels, which may lead to blurring of object edges.

In some embodiments, primitives may include shapes such as points and lines; the height, width and thickness parameters of such primitives may automatically be scaled so that, when downfiltered, these primitives have the same shape and size as in a non-antialiased image.

B. Multiple Passes Over Geometry Data

In another embodiment of the present invention, two or more multisampling passes are used to generate hybrid sampled data. That is, the primitives for an image are passed through multisampling rasterizer 334 two or more times. Each time, the pixel boundaries are shifted slightly relative to the positions of the primitives, so that the set of sample locations used for multisampling in each pass correspond to different points within the pixel. Data from each pass is advantageously stored in a different "target" buffer, which may be a different area within frame buffer 324 or a separate buffer. Contents of the target buffers are combined during downfiltering to arrive at a final pixel color.

Figure 5:
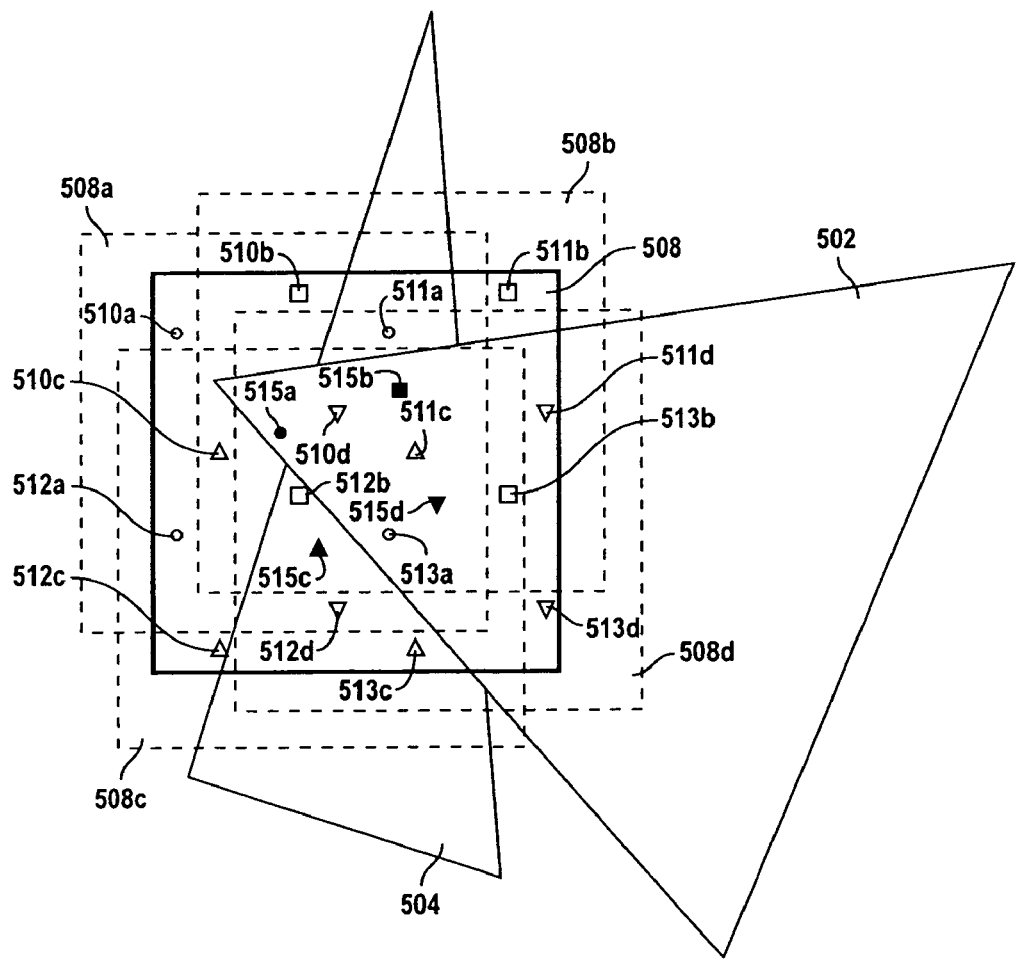
FIG. 5 is an illustration of a hybrid sampling pattern according to a second embodiment of the present invention.

FIG. 5 shows an example of a hybrid sampling pattern that can be obtained using a multipass technique. Primitives 502 and 504 are part of an image being rendered. The display includes a pixel 508. The primitives are multi-sampled four different times, using a square-centered 4 pattern each time. Each time, a different offset is applied to the viewport used for rendering the image.

The effect of changing the viewport offset is to shift the area covered by pixel 508 to four overlapping locations in the image. The shifted areas are indicated by boxes 508a, 508b, 508c, 508d (dashed lines). The shift amounts, expressed in (x, y) coordinates where the pixel is a 1-by-1 square, are (−0.2, 0.1) for box 508a, (0.1, 0.2) for box 508b, (−0.1, −0.2) for box 508c, and (0.2, −0.1) for box 508d. Each multisampling pass generates depth values at four locations in pixel 508 and one shading value, which is associated with each of the four depth locations. Specifically, the first pass (box 508a) generates depth values at locations 510a, 511a, 512a, 513a (hollow circles), and a shading value at location 515a (filled circle). The second pass (box 508b) generates depth values at locations 510b, 511b, 512b, 513b (hollow squares), and a shading value at location 515b (filled square). The third pass (box 508c) generates depth values at locations 510c, 511c, 512c, 513c (hollow triangles), and a shading value at location 515c (filled triangle). The fourth pass (box 508d) generates depth values at locations 510d, 511d, 512d, 513d (hollow inverted triangles), and a shading value at location 515d (filled inverted triangle).

Data from each pass can be stored in a different target buffer (e.g., in a different region within frame buffer 324) and downfiltered by a downstream component. Alternatively, an accumulation buffer can be used; data for a primitive is accumulated across multiple passes, and the result is used to update the frame buffer.

Figure 6:
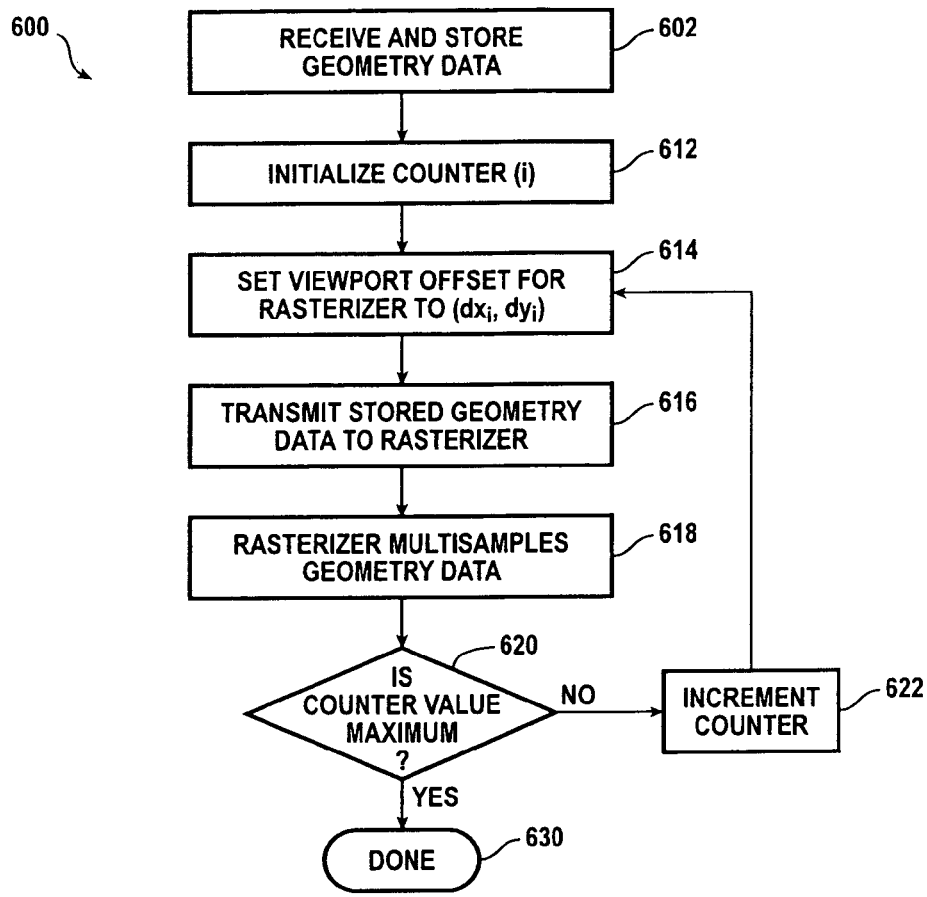
FIG. 6 is a flow chart of a process for generating hybrid-sampled pixel data according to a second embodiment of the present invention.

FIG. 6 is a flow chart of a multipass process 600 for generating hybrid sampled pixel data according to an embodiment of the present invention. Geometry data for the image is collected and stored, then provided to multisampling rasterizer 334 multiple times, with a different viewport offset each time.

More specifically, at step 602, geometry data for the image is received by the graphics processor and stored in a memory. A portion of graphics memory 316 may be used for storing geometry data, or a separate memory device (not shown) for storing the data may be provided. The data may also be processed by geometry unit 332 prior to storing, so that coordinate transformations and other per-primitive operations need not be repeated; to the extent that geometry unit 332 culls unseen primitives, processing by geometry unit 332 can reduce the amount of data that is stored. In an alternative embodiment, the geometry data is received and stored by a graphics driver program executing on CPU 302; the data can be stored in a portion of graphics memory 316, system memory 304, or a separate memory device (not shown).

After all of the geometry data has been received and stored, an iteration counter (i) is initialized, e.g., to zero, at step 612. At step 614, rasterizer 334 is instructed to set the viewport offset to a vector value $(dx_i, dy_i)$ associated with the current counter value. The viewport offset vector $(dx_i, dy_i)$ is advantageously chosen to be small enough that all shading and depth sample locations remain within the boundaries of pixel 508, as shown in FIG. 5, and each counter value is associated with a different viewport offset vector. One of the viewport offset vectors can be zero if desired.

At step 616, the stored geometry data is provided to multisampling rasterizer 334. At step 618, rasterizer 334 multisamples the data, and the resulting shading and depth values are stored in locations in frame buffer 324 (and depth buffer 326) selected according to the counter value. In one embodiment, data from each rasterizing pass is stored in different locations in frame buffer 324. In another embodiment, a number of frame buffers equal to the number of iterations are provided, and data from each pass is stored in a different frame buffer. In yet another embodiment, data is accumulated across the rasterizing passes using an accumulation buffer and transferred to the frame buffer after the final pass.

At step 620, it is determined whether the counter i has reached its maximum value, i.e., whether the desired number of rasterizing passes has been completed. If not, then the counter is incremented at step 622 and the process returns to step 614 to change the viewport offset and rasterize the set of primitives again.

Once all rasterizing passes have been completed, process 600 is done at step 630. Processing of the data continues with pixel operations and downfiltering. Examples of downfiltering processes will be described below.

It will be appreciated that the process described herein is illustrative and that variations and modifications are possible. Steps described as sequential may be executed in parallel, order of steps may be varied, and steps may be modified or combined. For example, rather than looping over the entire scene, it is also possible to loop over each primitive or over a group of primitives such as a strip of triangles. Instead of applying a different viewport offset for each pass, the vertices of each primitive can be modified as the primitive is provided to the rasterizer. In another embodiment, storing the primitives is performed by a graphics driver process executing on CPU 302; the data can be stored in graphics memory 316 or in system memory 304. Control mechanisms other than a counter may be used to generate the desired number of multisampling passes.

C. Relocated Primitives in Non-Overlapping Regions

In an alternative multipass embodiment, the image parameters are changed between passes so as to have the effect of relocating the primitives into different non-overlapping regions of the image pane in addition to applying a sub-pixel offset. This embodiment allows hybrid sampling patterns such as that shown in FIG. 5 to be obtained but does so without requiring that primitive data for an image be stored.

Figure 7:
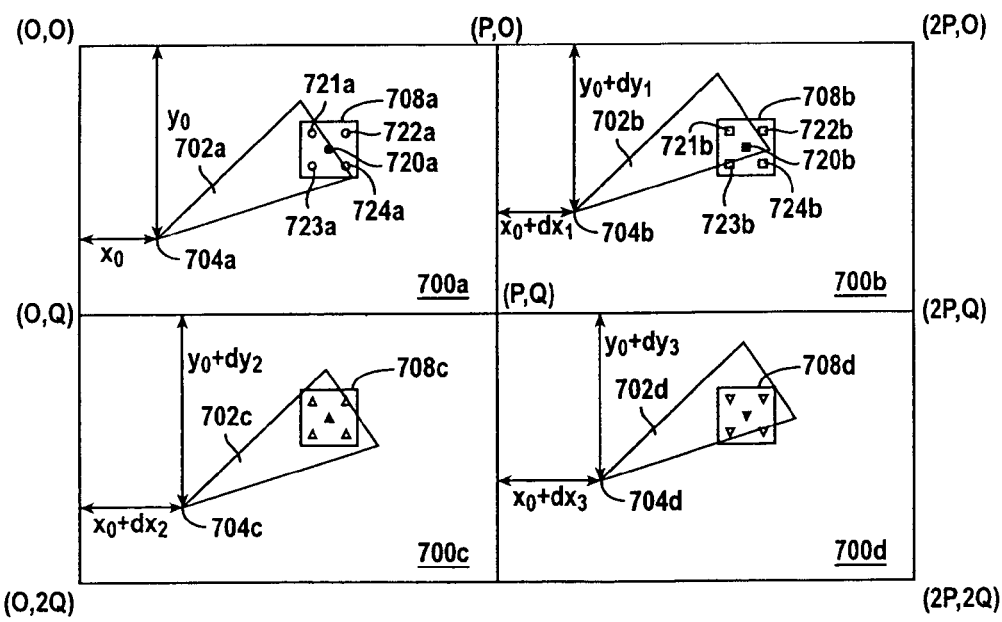
FIG. 7 is an illustration of relocated geometry data according to a third embodiment of the present invention.

FIG. 7 illustrates relocation of primitives. An image plane 700 is split into four non-overlapping regions. Region 700a is rectangular, extending from image plane coordinates (0, 0) to (P, Q). These coordinates advantageously correspond to the coordinates of the viewable area. Each of regions 700b–d is also rectangular, with region 700b extending from image plane coordinates (P, Q) to (2P, Q), region 700c from (0, Q) to (P, 2Q), and region 700d from (P, Q) to (2P, 2Q). A received primitive 702a within the viewable area lies within region 700a and has a vertex 704a at image plane coordinates $(x_0, y_0)$ as shown.

Each of the other regions 700b, 700c, 700d contains a relocated version of primitive 702a, i.e., primitives 702b, 702c, 702d, respectively. Each relocated version is displaced relative to the boundaries of its region by a region-specific "shift" vector in the x and y directions. For example, primitive 702a has a vertex 704a at image plane coordinates $(x_0, y_0)$. The corresponding vertex 704b of relocated primitive 702b is at image plane coordinates $(P+x_0+dx_1, y_0+dy_1)$; that is, vertex 702b is displaced by an amount $dx_1$ ($dy_1$) in the horizontal (vertical) direction relative to the boundary of region 700b. The other vertices of primitive 702b are also displaced by the same shift vector ($dx_1$, $dy_1$) so that the shape of primitive 702b is the same as the shape of primitive 702a. In region 702c, the shift vector is ($dx_2$, $dy_2$) and in region 702d, the shift vector is ($dx_3$, $dy_3$). In general, ($dx_1$, $dy_1$), ($dx_2$, $dy_2$) and ($dx_3$, $dy_3$) are each different vectors and none of them is equal to zero, so that a different shift is applied in each of regions 700a–d. It is also possible to displace the primitive in region 702a by a nonzero shift vector. The shift vectors are advantageously chosen to have a sub-pixel length, as will be described below.

When the relocated primitives 702a, 702b, 702c, and 702d are multisampled using a pixel size defined such that each region includes the true number of display pixels, the result is hybrid sampled pixel data. That is, for each pixel 708a in region 700a, there are corresponding pixels 708b, 708c, 708d in respective regions 700b, 700c, 700d. Each of these pixels is multisampled, e.g., using the square-centered 4 pattern illustrated.

Because the primitive was shifted within each region prior to multisampling, the shading and depth sample locations for each pixel are not at the same points of the primitive. For example, the shading location 720a in pixel 708a is near an edge of primitive 702a, while the shading location 720b in pixel 708b is near a different edge of primitive 702b and the shading location 720c in pixel 708c is well inside primitive 702c. If the shift vectors are selected such that all sample locations correspond to a single pixel of the display, the four corresponding pixels 708a, 708b, 708c, 708d provide the hybrid sampled data for one display pixel. In this embodiment, the result when the four corresponding pixels 708a, 708b, 708c, 708d are considered together is the same as the hybrid sampling pattern shown in FIG. 5.

Figure 8:
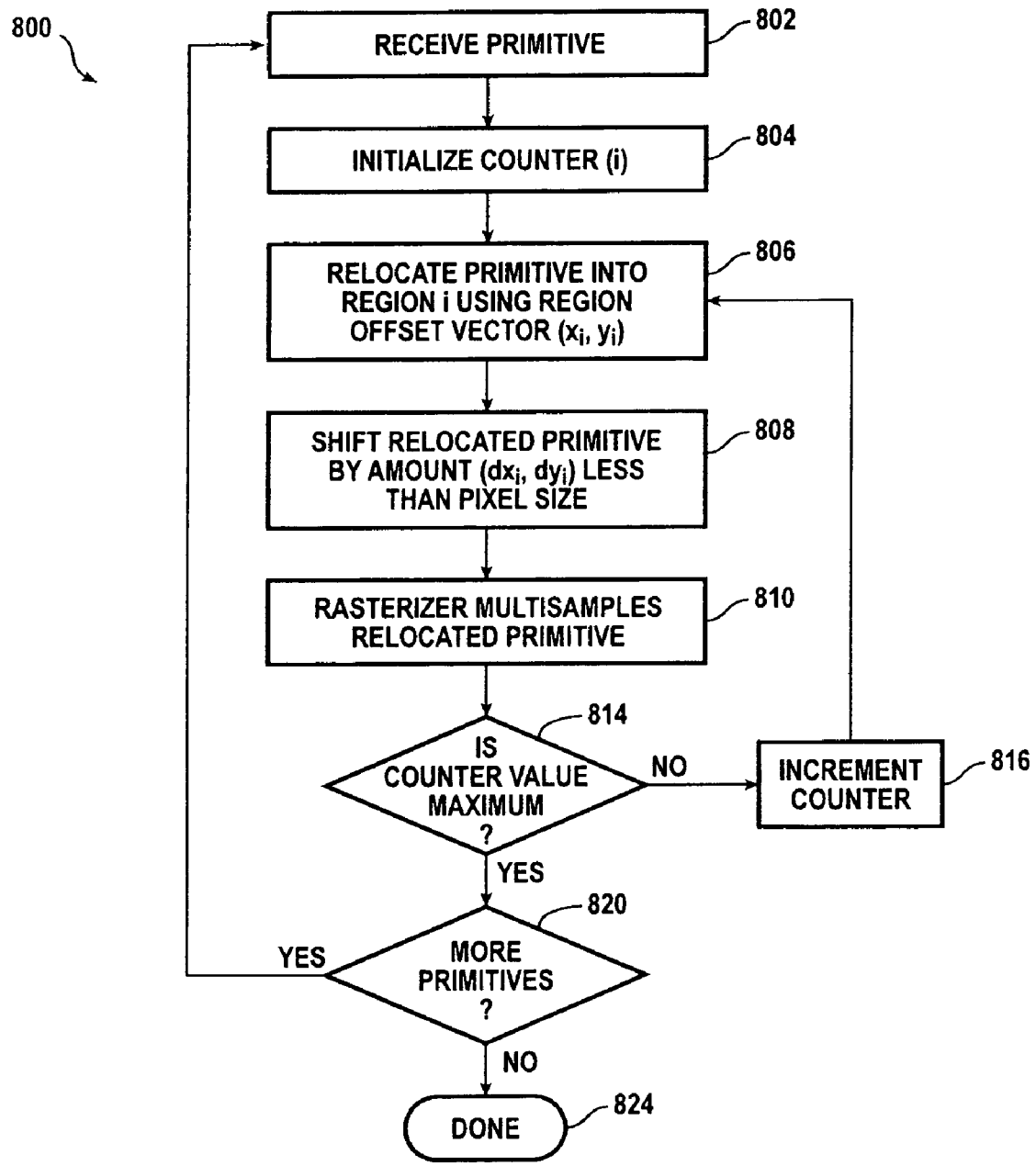
FIG. 8 is a flow chart of a process for generating hybrid-sampled pixel data according to a third embodiment of the present invention.

FIG. 8 is a flow chart of a process 800 for generating hybrid sampled pixel data using relocated primitives according to an embodiment of the invention. After performing geometric transformations, geometry unit 332 provides multiple copies of each primitive to rasterizer 334.

More specifically, at step 802, geometry data for a primitive is received and processed by geometry unit 332, thereby generating data for a primitive to be rasterized. At step 804, an iteration counter (i) is initialized to zero. This counter is used to determine the number of times the primitive has been relocated, and each counter value is used to cause rasterizer 334 to write data for a different one of the non-overlapping regions. For instance, in FIG. 7, i=0 can correspond to region 700a, i=1 to region 700b, i=2 to region 700c, and i=3 to region 700d.

At step 806, the primitive is relocated into region i by applying a region offset vector ($X_i$, $Y_i$) to the primitive. The region offset vector shifts the location of the primitive so that the primitive appears inside the desired region. For instance, in FIG. 7, region offset vector ($X_0$, $Y_0$)=(0, 0); region offset vector ($X_1$, $Y_1$)=(P, 0); region offset vector ($X_2$, $Y_2$)=(0, Q); and region offset vector ($X_3$, $Y_3$)=(P, Q). In some embodiments, the region offset vector is applied by algebraically adding the vector to each vertex of the primitive; in other embodiments, the region offset vector can be applied as a global window offset parameter associated with the primitive.

At step 808, the relocated primitive is shifted by a small amount, using the region-specific shift vector ($dx_i$, $dy_i$) described above. As described above, the magnitude of the shift vectors is advantageously smaller than the pixel size. In the embodiment shown in FIG. 7, the shift vector ($dx_0$, $dy_0$) for region 700a is zero, although a nonzero value can also be used. In some embodiments, the shift vector is applied by modifying each vertex coordinate of the primitive; in other embodiments, the shift vector can be applied by changing a viewport offset parameter associated with the primitive.

At step 810, the primitive is multisampled by rasterizer 334. As described above, the rasterizer is advantageously programmed to sample an area including all four regions and to use a pixel size such that each region contains the number of pixels to be displayed ($N_X$ by $N_Y$).

At step 814, the iteration counter (i) is checked to determine whether it has reached its maximum value, i.e., whether the desired number of sampling passes have been performed for the current primitive. In the embodiment of FIG. 7, the maximum counter value is 3. If not, then the counter is incremented at step 816, and process 800 returns to step 806 to relocate the primitive into the next region.

If, at step 814, the desired number of sampling passes have been performed, it is determined at step 820 whether more primitives remain to be processed. If so, the process returns to step 802 to process the next primitive. If not, then rasterizing process 800 is done (step 824). Graphics processing then proceeds to subsequent stages, including pixel operations and downfiltering. For each pixel of the display, the downfiltering unit combines data from corresponding pixels in each of the non-overlapping regions to arrive at a final color value. Examples of downfiltering will be described below.

It will be appreciated that the process described herein is illustrative and that variations and modifications are possible. Steps described as sequential may be executed in parallel, order of steps may be varied, and steps may be modified or combined. For instance, rather than looping over each primitive, it is also possible to loop over a group of primitives (such as a strip of triangles) or the entire scene. Rather than changing the global window and viewport offset parameters, copies of primitives with shifted vertex coordinates can be created. Instead of storing data from each region to a target buffer that is in a separate section of a frame buffer, the frame buffer can be organized such that data from each region that corresponds to the same display pixel is stored contiguously. As another option, separate target buffers can be provided for storing data from each region. In yet another embodiment, an accumulation buffer is used to collect and combine data from each region.

III. Downfiltering

Examples of techniques for downfiltering (or downsampling) hybrid-sampled pixel data will now be described. Any of these techniques can be used with any of the various embodiments described above or with other embodiments of hybrid sampling. In some embodiments, downfiltering occurs prior to scanout, with the downfiltered data (i.e., one shading value per pixel) being written to a downfiltered image buffer (e.g., display buffer 328 of FIG. 3) for subsequent scanout. In these embodiments, downfiltering may be performed either as the hybrid-sampled pixel data for each primitive is generated or during a subsequent rendering pass after hybrid-sampled pixel data has been generated for all primitives. In other embodiments, downfiltering is performed during scanout by scanout control logic 320, as mentioned above, and the resulting shading value for each pixel is provided to display device 310 without an intermediate step of storing the data in a display buffer.

As described above, the pixel data resulting from hybrid sampling includes a shading value and corresponding depth value at each of a number of locations within a pixel. Thus, any downfiltering technique that can be used for supersampled or multisampled pixel data can also be used with hybrid sampled pixel data. For example, in one embodiment, downfiltering is done by simply computing an average of the shading values. In one alternative embodiment, the average is a weighted average; e.g., shading values corresponding to depth locations closer to the center of the pixel can be given greater weight than shading values nearer the edge.

In some embodiments, downfiltering of hybrid sampled pixel data is performed by leveraging texture blending components of a graphics processing system, using the hybrid-sampled pixel data as one or more texture maps. As is known in the art, a texture map is made up of a number of elements ("texels"), each of which has a single color value. A texture processing unit (which may be implemented, e.g., in dedicated hardware within pixel operation unit 336 of FIG. 3) determines a texture value for a pixel by selecting one or more appropriate texels from a texture map (based, e.g., on the screen position and depth value for the pixel); where multiple texels are selected, the values are blended according to various techniques, such as bilinear or trilinear filtering. In accordance with an embodiment of the present invention, the texture blending component can be used for downfiltering of oversampled (e.g., hybrid sampled) data, with each color sample being treated as a texel. Where hybrid sampled data is written to multiple target buffers (as in the multipass embodiments described above), each target buffer can be treated as a separate texture.

Figure 9:
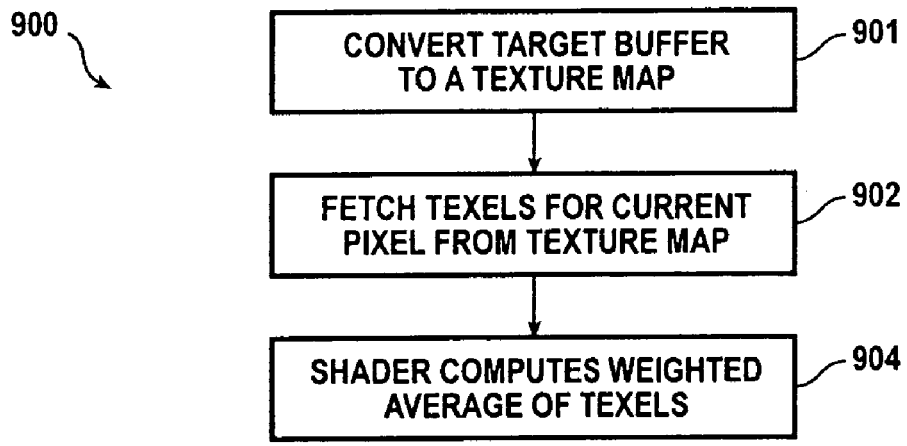
FIG. 9 is a flow chart of a process for filtering hybrid-sampled pixel data according to an embodiment of the present invention.

FIG. 9 is a flow chart of a process 900 for downfiltering hybrid-sampled pixel data according to an embodiment of the present invention. In process 900, all of the hybrid sampled data has been stored in a target buffer that is used as a single texture map; for instance, the hybrid sampled data may be generated using the "pre-bloated" buffer of process 400 described above. At step 901, the target buffer is converted to a texture map. The conversion is advantageously done by simply accessing the shading values stored in the target buffer as a texture (e.g., by setting values in one or more registers of GPU 314 that identify regions in graphics memory 316 where texture data is stored). At step 902, the texture processing unit fetches the texels corresponding to a pixel from the texture map (or target buffer). For instance, for the hybrid sampling pattern shown in FIG. 2, sixteen texels would be fetched.

At step 904, a shader unit (which may be, e.g., another dedicated hardware element within pixel operation unit 336 of FIG. 3) computes a weighted average of the texels fetched at step 902. The weights may be equal or unequal as desired; for instance, depth locations nearer to the center of the pixel may be given larger weights. For example, for the hybrid sampling pattern shown in FIG. 2, a bicubic weighting scheme can be used; more generally, Gaussian weighting for pixels in an N-by-N array can be used. Other weighting schemes may also be used. The weighted average is the final color value for the pixel. It will be appreciated that other texture blending techniques, such as bilinear filtering, may also be implemented for blending multiple texels.

Figure 10:
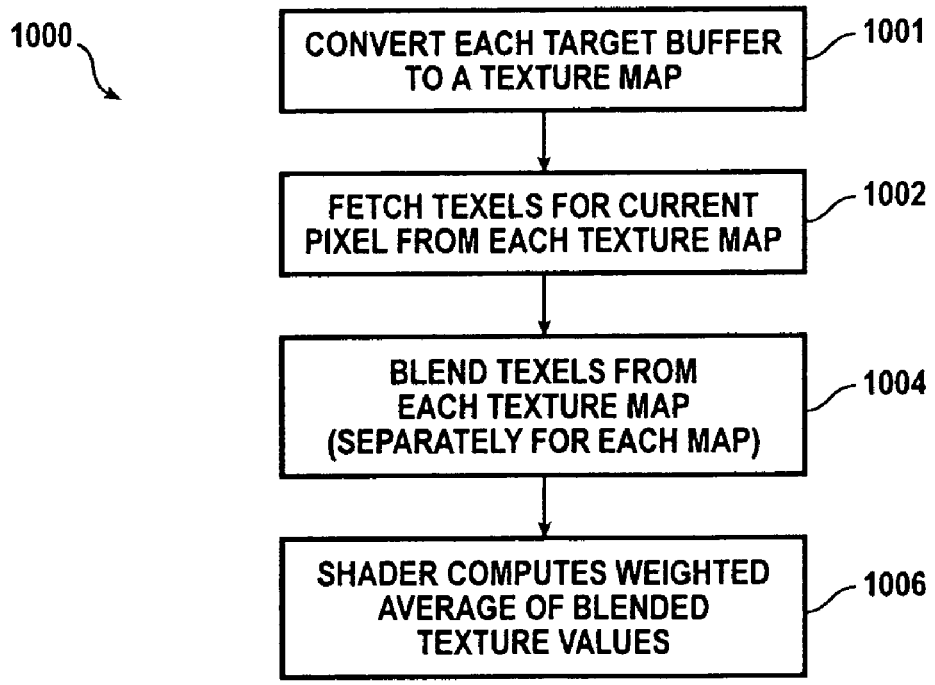
FIG. 10 is a flow chart of a process for filtering hybrid-sampled pixel data according to an alternative embodiment of the present invention.

FIG. 10 is a flow chart of an alternative process 1000 for downfiltering hybrid-sampled pixel data according to an embodiment of the invention. In process 1000, the hybrid sampled data has been stored in multiple target buffers, e.g., in accordance with either of processes 600 and 800 described above. At step 1001, each target buffer is converted to a texture map; this step can be generally similar to step 901 of process 900 described above. In multipass embodiments, the number of texture maps advantageously corresponds to the number of passes; for instance, in the embodiment of FIG. 5, samples are generated in four passes, each of which can provide data for a different texture map so that four texture maps may be created. At step 1002, the texture processing unit fetches the texels corresponding to the pixel from each of the texture maps. For instance, in the embodiment of FIG. 5, texels 510a, 511a, 512a, and 513a would be fetched from the texture map of the first pass; texels 510b, 511b, 512b, and 513b would be fetched from the texture map of the second pass and so on. Texel fetching for different maps may be executed sequentially or in parallel, depending on the system configuration.

At step 1004, the texture mapping unit blends the texels fetched from each texture map. This blending is advantageously performed separately for each map, and blending for different maps may be done sequentially or in parallel, depending on system configuration. Various blending techniques may be employed. For instance, in the embodiment of FIG. 5, four texels arranged in a grid are fetched from each texture map; bilinear filtering may be used for fetching (step 1002) and blending (step 1004).

At step 1006, a shader unit generates the final pixel color by blending the shading values generated at step 1004. Blending can be done by computing a weighted average, in which all shading values can be given the same weight or different values can be given different weights.

It will be appreciated that processes 900 and 1000 are illustrative and that variations and modifications are possible. For instance, downfiltering may also be performed using anisotropic filtering techniques; in an embodiment that has eight depth samples per pixel arranged in a 4×2 grid, 2:1 anisotropic filtering may be used. In some hardware-based implementations of texture blending, anisotropic filtering can process a 4×2 grid using a single texture fetch operation while a bilinear filtering technique requires two texture fetch operations (one for each 2×2 subset of the 4×2 grid). Persons of ordinary skill in the art will appreciate that selection of texture blending or other downfiltering techniques for a particular embodiment generally depends on the particular hardware features as well as on the number of samples per pixel and organization of sample data into one or more buffers. In general, any downfiltering technique suitable for use with supersampled or multisampled pixel data can also be employed for downfiltering hybrid sampled pixel data, and processes such as those described herein for hybrid sampled data can also be used for downsampling other types of oversampled pixel data, including supersampled or multisampled data.

IV. Configuration

The embodiments of the invention described above provide hybrid sampling of pixel data within the graphics driver and/or graphics processing subsystem, thereby making the hybrid sampling transparent to the application. That is, an application that generates geometry data is not required to specify hybrid sampling parameters or do anything else to control the operation of hybrid sampling.

As is generally known in the art, there are tradeoffs between image quality and processing speed. For example, using a larger number of sampling locations generally improves antialiasing but decreases the speed at which images can be rendered. In embodiments of the present invention, where hybrid sampling is provided, a spectrum of antialiased image quality versus rendering speed is created, progressing from no antialiasing to multisampling at a given number of depth locations to hybrid sampling at that number of depth locations to supersampling. The optimal antialiasing approach may vary from one application to the next; some applications require fast rendering, while others place more of a premium on image quality.

In embodiments of the present invention, the availability of hybrid sampling can increase a system's ability to adapt to changing demands. For example, some embodiments of the present invention provide configurable parameters that can be modified to select among antialiasing options, including no antialiasing, multisampling, hybrid sampling, or supersampling. For example, one configurable setting may control a choice among multisampling patterns (e.g., 1X, 2X, 4X), thereby determining the number of depth locations associated with each shading location; another configurable setting may control the number of times (e.g., 1, 2, 4, 16) the multisampling pattern is to be applied to each pixel, thereby determining the number of shading locations. Different combinations of these selections result in different behavior. For example, a 1X multisampling pattern applied once provides no antialiasing; a 1X multisampling pattern applied sixteen times provides conventional 16X supersampling; and a 4X multisampling pattern applied four times provides hybrid sampling with sixteen depth locations and four color locations per pixel. It is to be understood that any number and combination of options may be provided for the multisampling pattern and the number of times the pattern is applied.

By selecting appropriate parameters, the performance of a graphics processing system embodying the present invention can be optimized for a particular application. In some embodiments, an application program interface (API) can be provided in the graphics driver for purposes of configuring the hybrid sampling options. As is generally known, an API provides a set of function calls that an application programmer can invoke in order to interact with various features of a platform on which the application is running, e.g., by adjusting graphics processing parameters to optimize the application's performance. In an embodiment of the present invention, the API of the graphics driver can include function calls that enable or disable hybrid sampling, select the multisampling pattern to be used by the rasterizer (or the number of depth locations), select the number of times the pattern is to be applied (or the number of shading locations), select among various downfiltering methods, and so on.

In other embodiments, a user interface enabling the user to configure the graphics processing subsystem is provided. A user interface may be implemented using conventional interface components such as dialog boxes the user can activate by an appropriate command or sequence of commands. The user interface may enable the user to adjust any configurable parameter of the system, including the hybrid sampling parameters described above.

In still other embodiments, a graphics driver program may be capable of automatically selecting appropriate antialiasing settings based on "hints" derived from properties or behavior of an executing application. For example, in one embodiment, the graphics processing system may detect that an application is using texturing in combination with alpha blending (alpha blending is a well-known technique for allowing objects in an image to be wholly or partially transparent, where the degree of transparency is controlled by a parameter "alpha"). In alpha blending modes, as is known in the art, coverage can be determined from the alpha parameter. Accordingly, since a larger number of depth sample locations can be tested with minimal additional computation, and the processing system may elect to increase the number of depth locations, e.g., switching from multisampling to hybrid sampling or from hybrid sampling to supersampling, to improve image quality. As another example, the graphics processing system may detect that an application is not using texturing at all; in that case, the system may switch from hybrid sampling or supersampling to straight multisampling, which generally provides sufficient antialiasing for images without textures. Those of ordinary skill in the art will recognize that other properties or behavior of an application may serve as hints, and any number of such hints may be used in selecting appropriate antialiasing settings. Feedback data, e.g., an estimate of rendering time for each frame, might also be used to select a setting that prevents an acceptable rendering speed. In some embodiments, a user or application may be able to disable or override automatic selection functionality of the driver.

V. Conclusion

Embodiments of the present invention relate to hybrid-sampled pixel data. Hybrid sampling provides antialiasing benefits comparable to supersampling with a given number of samples per pixel, but at a reduced computational cost because fewer shading values are computed. For instance, hybrid sampling with sixteen depth locations and four shading locations per pixel (e.g., as shown in FIGS. 2 and 5) can provide antialiasing benefits approximating supersampling at sixteen locations per pixel, but the computational overhead is considerably reduced because only four shading values (instead of sixteen) are computed.

While the invention has been described with respect to specific embodiments, one skilled in the art will recognize that numerous modifications are possible. For instance, the square-centered 4 multisampling pattern described herein is not required; other multisampling patterns can be substituted. Any number of depth locations and any number of shading locations can be used, with the number of depth locations exceeding the number of shading locations. Sample locations at pixel edges or corners can be selected, and sample data for such locations can be shared between adjacent pixels, thereby reducing the total amount of memory required. For example, hybrid sampling can be based on a 2X "diagonal centered" multisampling pattern that uses two depth sample locations arranged along a diagonal of the pixel, with the image pre-bloated to $N_x$ by $2N_y$; alternatively, multiple sampling passes can be used with appropriate offsets.

In addition, data compression can be used to reduce the storage requirements at various stages of the hybrid sampling operation. Numerous compression algorithms that exploit coherence in color and depth values are known in the art and any such algorithm may be implemented in conjunction with hybrid sampling, e.g., to store results of each multisampling pass in embodiments that perform multiple passes.

Use of a multisampling rasterizer is also not required; a hybrid-sampling rasterizer that generates a number of shading values and a larger number of depth values per pixel could also be constructed and used. Where a multisampling rasterizer is used, the rasterizer can be programmed to use different sampling patterns in different passes or for different screen regions.

The hybrid sampling techniques described herein can also be implemented in graphics processing software executing in a central processing unit transparent to applications (e.g., as part of a graphics driver program) and/or a dedicated graphics processing unit, as well as in hardware components or any combination of hardware and software.

Thus, although the invention has been described with respect to specific embodiments, it will be appreciated that the invention is intended to cover all modifications and equivalents within the scope of the following claims.

What is claimed is:

1. A method for generating a color value for a pixel from geometry data, the method comprising:
   selecting a first plurality of shading locations and a second plurality of depth locations for the pixel, the second plurality being larger in number than the first plurality, each of the second plurality of depth locations being associated with one of the shading locations;
   under control of a graphics processing subsystem, generating a plurality of hybrid sampled data points equal in number to the second plurality of depth locations, wherein the act of generating includes:
      computing a shading value at each of the first plurality of shading locations and a depth value at each of the second plurality of depth locations; and
      storing one of the depth values and the associated shading value as one of the hybrid sampled data points; and
   computing an antialiased color value for the pixel using the hybrid sampled data points.

2. The method of claim 1 wherein the act of generating the plurality of hybrid sampled data points includes:
   performing at least two multisampling operations on the pixel,
   wherein each multisampling operation uses a different one of the shading locations and a different subset of the depth locations and generates a different subset of the plurality of hybrid sampled data points.

3. The method of claim 2 wherein the subset of the hybrid sampled data points generated by each multisampling operation is stored in a corresponding one of a plurality of target buffers.

4. The method of claim 2 wherein the subset of the hybrid sampled data points generated by each multisampling operation is accumulated in an accumulation buffer.

5. The method of claim 1 wherein each of the depth locations is inside the pixel.

6. The method of claim 1 wherein each of the shading locations is inside the pixel.

7. The method of claim 1 wherein the geometry data includes a primitive, the method further comprising, prior to storing one of the depth values and the associated shading value, determining whether the primitive covers the depth location,
   wherein the one of the depth value and the associated one of the shading value are not stored in the event that the primitive does not cover the depth location.

8. The method of claim 1 wherein the act of selecting the first plurality of shading locations and the second plurality of depth locations for the pixel includes:
   segmenting a viewable area that includes the pixel into a number of sub-pixels, each sub-pixel having a size smaller than a size of the pixel,
   wherein each sub-pixel includes one of the shading locations and a subset of the depth locations.

9. The method of claim 8 wherein associating each of the second plurality of depth locations with one of the shading locations includes:
   associating each of the depth locations of a sub-pixel with the shading location of that sub-pixel.

10. The method of claim 8 wherein the pixel is divided into an integer number of sub-pixels.

11. The method of claim 8 wherein the act of segmenting the viewable area includes providing a multisampling rasterizer with a display resolution that is larger than a true display resolution.

12. The method of claim 10 wherein the pixel is divided into four sub-pixels arranged to form a quad.

13. The method of claim 1 wherein the act of selecting the first plurality of shading locations and the second plurality of depth locations for the pixel includes:
   defining a multisampling pattern for the pixel, the multisampling pattern including one of the depth locations and at least two of the shading locations;
   generating a plurality of iterations of the geometry data, wherein each iteration has a different offset relative to a boundary of the pixel; and
   applying the multisampling pattern to each of the iterations of the geometry data.

14. The method of claim 13 wherein each of the offsets corresponds to an amount less than a pixel size.

15. The method of claim 14 wherein one of the offsets is equal to zero.

16. The method of claim 13 wherein the act of generating the plurality of iterations includes, for each iteration, setting a value of a viewport offset parameter corresponding to the offset of the iteration.

17. The method of claim 13 wherein generating the plurality of hybrid sampled data points includes:
   storing the depth values and the associated shading value obtained from each iteration in a respective one of a plurality of buffers.

18. The method of claim 1 wherein the act of selecting the first plurality of shading locations and the second plurality of depth locations for the pixel includes:

defining a multisampling pattern for the pixel, the multisampling pattern including one of the depth locations and at least two of the shading locations;

defining a plurality of non-overlapping regions in an image coordinate space, each region including a virtual pixel corresponding to the pixel;

relocating the geometry data to a position within each of the regions, wherein the position of the relocated geometry data relative to a boundary of the region is shifted by an amount less than a pixel size; and applying the multisampling pattern to each of the virtual pixels.

19. The method of claim 18 wherein one of the regions corresponds to a viewable area of the image coordinate space.

20. The method of claim 18 wherein for one of the regions, the amount less than a pixel size is zero.

21. The method of claim 18 wherein relocating the geometry data includes:

setting a value of a window offset parameter such that the geometry data is placed within one of the regions; and setting a value of a viewport offset parameter corresponding to the shift by an amount less than a pixel size.

22. The method of claim 18 wherein the act of relocating the geometry data is performed by the graphics processing subsystem.

23. The method of claim 1 wherein the act of computing the color value for the pixel includes:

defining a texture map including a second plurality of texels corresponding to the hybrid sampled data points for the pixel;

fetching the second plurality of texels; and computing a weighted average of the fetched texels, thereby determining the color value for the pixel.

24. The method of claim 1 wherein the act of computing the color value for the pixel includes:

defining a plurality of texture maps, each texture map including a plurality of texels corresponding to a subset of the hybrid sampled data points for the pixel;

for each of the plurality of texture maps:

fetching the plurality of texels from the texture map; and blending the fetched texel values to generate an intermediate value; and computing a weighted average of the intermediate value generated for each of the texture maps, thereby determining the color value for the pixel.

25. The method of claim 1 wherein the act of computing the color value for the pixel is performed during a scanout operation that provides downfiltered color data to a display device.

26. The method of claim 1 wherein the acts of generating the plurality of hybrid sampled data points and computing the color value for the pixel are performed in a single rendering pass.

27. The method of claim 1 wherein the number of shading locations and the number of depth locations are determined based on one or more configurable parameters.

* * * * *